(12) United States Patent
Hintikka (10) Patent No.: US 11,471,880 B2
(45) Date of Patent: Oct. 18, 2022

(54) TIP REMOVAL IN AUTOMATED PIPETTE MODULE

(71) Applicant: Sartorius Biohit Liquid Handling Oy, Helsinki (FI)

(72) Inventor: Ville Hintikka, Helsinki (FI)

(73) Assignee: Sartorius Biohit Liquid Handling Oy, Helsinki (FI)

( * ) Notice: Subject to any disclaimer, the term of this patent is extended or adjusted under 35 U.S.C. 154(b) by 0 days.

(21) Appl. No.: 16/784,272

(22) Filed: Feb. 7, 2020

(65) Prior Publication Data
US 2020/0254440 A1 Aug. 13, 2020

(30) Foreign Application Priority Data
Feb. 7, 2019 (EP) ..................................... 19397503

(51) Int. Cl.
*B01L 3/02* (2006.01)
(52) U.S. Cl.
CPC .......... *B01L 3/0279* (2013.01); *B01L 3/0227* (2013.01)
(58) Field of Classification Search
None
See application file for complete search history.

(56) References Cited

U.S. PATENT DOCUMENTS

| 6,589,483 | B1* | 7/2003 | Maeda | G01N 35/1065 |
| | | | | 73/863.25 |
| 2001/0039843 | A1* | 11/2001 | Schoeppe | G01N 35/1065 |
| | | | | 73/863.32 |
| 2003/0190264 | A1* | 10/2003 | Yiu | B01L 3/0227 |
| | | | | 422/525 |
| 2004/0033554 | A1* | 2/2004 | Powers | G01N 35/028 |
| | | | | 422/400 |
| 2011/0214517 | A1 | 9/2011 | Butz et al. | |
| 2018/0154349 | A1* | 6/2018 | Habbal | G01N 35/1011 |
| 2019/0195901 | A1* | 6/2019 | Iwasaki | G01N 35/1011 |
| 2019/0314808 | A1* | 10/2019 | Wilmer | B01L 3/0217 |
| 2021/0008544 | A1* | 1/2021 | Tamai | G01N 35/1072 |

FOREIGN PATENT DOCUMENTS

| CN | 1984717 A | 6/2007 |
| CN | 202830488 U | 3/2013 |
| CN | 203422382 U | 2/2014 |
| CN | 203606197 U | 5/2014 |
| CN | 205292060 U | 6/2016 |
| CN | 205361384 U | 7/2016 |
| CN | 106459866 A | 2/2017 |
| CN | 206408557 U | 8/2017 |
| CN | 108187772 A | 6/2018 |
| CN | 111448461 A | 7/2020 |
| DE | 102010047126 A1 | 4/2012 |
| EP | 3159397 A1 | 4/2017 |
| JP | H587820 A | 4/1993 |
| JP | 200097950 A | 4/2000 |

* cited by examiner

*Primary Examiner* — Brian R Gordon
(74) *Attorney, Agent, or Firm* — Laine IP Oy (57) ABSTRACT

An automatic pipette system is provided which includes a module body, said body including a stationary contact surface, and an ejection assembly, including a mount for a pipette tip, and a motor, located within the module body and configured to: dispense liquid by actuating a piston in a cylinder, and to move the ejector assembly in a first direction in such a manner that the pipette tip contacts the contact surface and disengages from the mount.

13 Claims, 6 Drawing Sheets

TIP REMOVAL IN AUTOMATED PIPETTE MODULE

FIELD OF THE INVENTION

The present invention relates to automated pipettes, more specifically robotic pipette devices, which may be air displacement pipettes.

BACKGROUND

Pipettes are hand-held or automated media delivery devices that are used for delivering a precisely defined amount of liquid from one receptacle to another receptacle. Liquid is aspirated into and delivered from a disposable tip that is attached to a lower end of the pipette.

In cylinder-based air displacement pipettes, liquid is dispensed by downward motion of a plunger within a cylinder, whereby air is displaced from the cylinder. The plunger has a range of motion within the cylinder. In order to aspirate a desired volume of liquid into the tip, the end of the tip is placed in a sample liquid and the plunger is retracted to the upper stop, thus receiving the desired volume of liquid. Then, to dispense the desired volume of liquid, the tip of the pipette is moved to a receptacle for receiving the liquid and the plunger from the upper stop to the lower stop. The amount of liquid aspirated and dispensed corresponds to the volume of displaced air.

Manual, that is to say hand-operated, liquid dispensing pipettes typically have a mechanism for the removal of the tip so that the user does not need to remove the tip by grasping it manually. The tip is held in place at the lower end of a pipette's tip mandrel or tip cone by friction. To detach the tip, the user presses a tip removal button that is operable by the user's thumb and typically located in the upper part of the pipette, near the control knob that is used for aspirating and dispensing. The mechanism comprises a removal sleeve sliding on a cylinder part of the pipette and an arm fixed thereto and sliding in the handle of the pipette or on its side. The mechanism is connected with a spring, which pushes the arm into the upper position. When the arm is pressed downwards, the sleeve disengages the tip attached to the tip cone, i.e. the end of the cylinder. To reiterate, when the user actuates the tip removal button, the removal sleeve is actuated downwards and forces the tip off the tip mandrel.

In electronic automatic pipettes the removal of the tip is typically done by utilizing a separate, tip removal motor. These solutions typically also utilize a return spring. Also some solutions exist wherein the automatic pipette as such does not incorporate a tip removal mechanism. In this type of solution the tip is removed e.g. by actuating the tip cone (with the tip attached) into a tip disposal box with a removal feature (e.g. a hook or a notch) in such a manner that when the pipette is actuated or moved upwards, the tip is removed from the tip cone.

Various problems are inherent in the above-mentioned prior art solutions. For example, a separate tip removal feature requires excessive moving of the pipette. In addition, the disposal box must be of a specific type to facilitate the tip removal. In solutions wherein the tip is removed by a separate motor, the pipette mechanism is necessarily more detailed and heavy, which results in higher requirements for actuating the pipette. Solutions which remove the tip by moving the entire assembly US Patent Publication 2003/0147781 discloses a pipette comprising a body; an arm movable relative to the body parallel to a longitudinal direction of the pipette in order to eject a cone fixed to the body; and a button for controlling movement of the arm. The pipette is arranged in such a manner that the button applies sliding thrust on the arm while the arm is moving relative to the body.

In the alternative, as detailed in EP Publication EP3112026, a handheld pipette may comprise a tip removal mechanism adapted for lifting an inner mechanism of the pipette with regard to a body of the pipette when the user presses the tip removal button. That disclosure further relates to a method for disengaging a disposable tip attached to a tip cone of a pipette of the present invention, and to a method for pipetting with a pipette according to the present invention. However, in contrast to the present disclosure, that document discloses where a first mechanism is used to transmit a first motive force to the cylinder for dispensing liquid and a second mechanism is used to transmit a second motive force.

SUMMARY OF THE INVENTION

The invention is defined by the features of the independent claims. Some specific embodiments are defined in the dependent claims.

According to a first aspect of the present invention, there is provided an automatic pipette system comprising a stationary contact surface, an ejector assembly, comprising a mount for a pipette tip, a motor, configured to move the ejector assembly in a first direction in such a manner that the tip contacts the contact surface and disengages from the mount.

According to a second aspect of the present invention, there is provided a method for removing a tip attached to a tip mount of a pipette module, the method comprising using a motor which is configured to actuate an ejector assembly of the pipette module in a first direction with respect to a module body, so that the tip contacts a surface of the module body and disengages.

EMBODIMENTS

In the present context, the term "pipette" is intended to refer to a media delivery and handling device such as a micropipette, used in chemical, biological and medical applications. Such a pipette may utilize air displacement, positive displacement or e.g. volumetric technologies. Further, the term "assembly" is meant to refer to a mechanism comprising at least one mechanical member and supporting components such as gears, screws, hooks, magnets, electric and electromechanical components. Finally, the term "disposable tip" refers to single-use tools commonly made of plastic (e.g. polypropylene), or in certain cases out of other materials such as plastic, the plastic may filled with carbon fiber or other additives. Tip volumes differ and for example may range from 10 microliters to 10 milliliters, however both larger and smaller volumes are used in the context of the invention.

Typically, a reusable tip is removed from a pipette by having a "sleeve" which rapidly descends and pushes the tip off the tip mount. Using the above-mentioned method, it is possible that the tip is removed with an abundance of speed, resulting in excessive travel speed of the detached tip. The invention of the present disclosure allows for gently nudging the tip of the pipette, therefore removing the tip with minimal speed. This results in less splatter, reducing the risk of contamination and the need for cleanup.

Figure 1:
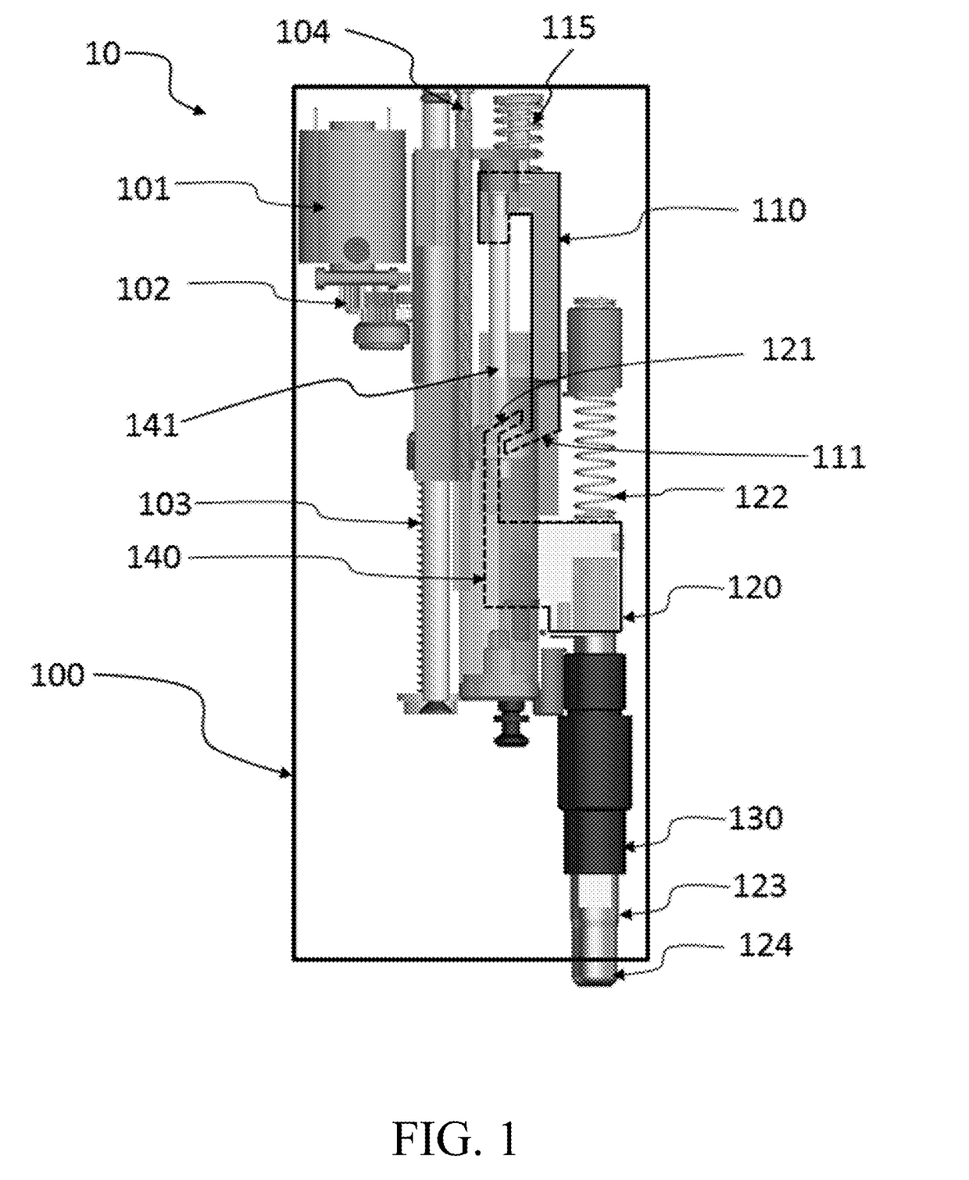
FIG. 1 illustrates a schematic view of an automated pipette module in accordance with at least some embodiments of the present invention.

FIG. 1 illustrates a schematic view of the pipette system in accordance with at least some embodiments of the present invention. The automated pipette of the present disclosure is comprised of the module 10, comprised of at least one motor 101, an optional transmission 102, at least one lead screw 103, at least one linear guide 104, at least one slide assembly 110 and locking hook 111, at least one cylinder 140 and a piston 141, the ejector assembly 120 comprising a locking tab 121, the ejector spring 122 and the control electronics. The ejector assembly 120 may also be referred to as the ejector slider or ejector assembly. In addition, the pipette comprises the mandrel 123, the mandrel guide 130, a cavity extending through the body in the lengthwise direction and a tip cone 124 (also known as the nose cone), which is usually slightly bevelled to accommodate the disposable tip 150. In the alternative, the tip cone may comprise an upper annular bump and a lower annular bump, with the lower annular bump having a smaller diameter than the upper annular bump. Further, the pipette may comprise a spring-loaded tip cone, i.e. an adjustable stiffening element comprising a spring 115 and a mechanism suited for arresting 116 such as the Optiload™ system. Such a system provides an easy way to limit the maximum amount of force which can be used when performing tasks such as picking up a pipette tip.

In some embodiments, the pipette components may comprise a rack and pinion mechanical linkage. The components may also comprise linear guides, axes, linkages, springs, magnets, transmissions, mounts for components, as well as fluid handling components such as tubing or hoses. In addition the module may comprise one or more of the following: a processor, a printed circuit board, sensors such as cameras or imaging equipment, connectors for wireless and wired communications, connectors for wireless and wired power transmission, passive or active cooling elements.

In a first exemplary embodiment of the present invention, an electric motor 101 actuates the linear movement mechanism via a transmission 102 comprised of at least one of the following: a gear, a planetary gear, a clutch, a belt, a timed belt, a cogged belt, a toothed belt, a notched belt. The linear movement mechanism may comprise a lead screw 103 and/or a linear guide 104, for example. The linear movement mechanism is coupled to the slide assembly 110, and therefore the piston 141. Therefore, in this exemplary embodiment, actuating the motor 101 in a first direction (i.e. clockwise or counter-clockwise) results in the slide assembly 110 moving in a first direction as well. This is true as well for the reverse direction of the motor, i.e. actuation of the motor in the reverse direction will lead to reverse direction of the slide assembly. This results in the piston 141 moving within the cylinder 140. The resulting pressure in the cylinder is used to dispense the liquid via the tip mandrel 123 and the tip 150. The amount of liquid aspirated and dispensed corresponds to the volume of displaced air.

Figure 4:
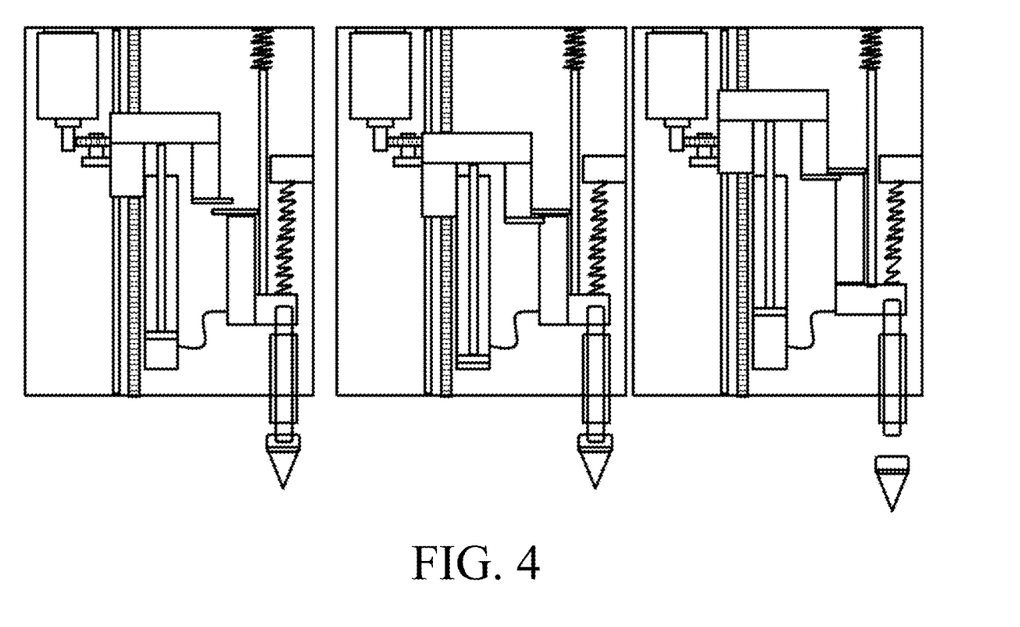
FIG. 4 illustrates a schematic view of the pipette tip removal sequence in accordance with at least some embodiments of the present invention.

Also in the first exemplary embodiment, the slide assembly 110 is selectively coupled to the ejector assembly 120 via a linkage or transmission. Therefore the ejector assembly is not always actuated when the slide assembly is actuated, which allows normal operation of the liquid dispensing without moving the ejector assembly. To reiterate, during the liquid dispensing the ejector assembly may be immobile in the normal (lowest) position. In an exemplary embodiment shown in FIG. 4, the ejector assembly is actuated as follows:

1. The motor 101 actuates the slide assembly 110 in a first direction (downwards).
2. The slide assembly locking hook 111 passes the locking tab 121 of the ejector assembly.
3. The motor 101 actuates the slide assembly 110 in a second direction (upwards).
4. The slide assembly locking hook 111 contacts the locking tab 121 of the ejector assembly 120.
5. The slide assembly, connected to the ejector assembly 120 via the hook 111 and tab 121 pulls the ejector assembly 120 in the second direction.
6. The ejector assembly 120 is connected to the tip mandrel 123 and thus to the tip 150. The tip mandrel 150 moves within the mandrel guide 130 and is therefore, as a result of the upward motion of the slide assembly 110 and the ejector assembly 120, the tip mandrel and tip are moved in the second direction. The tip mandrel therefore withdraws into the module body 100.
7. The top surface of the tip 150 contacts the module body 100 and the resulting force removes the tip from the tip cone 124 (the lower end of the mandrel 123).
8. After the tip is removed from the tip cone and optionally a predefined delay, the ejector assembly moves upwards and comes into contact with the guide slope which detaches the hook 111 and the tab 121 from each other.
9. The ejector assembly returns to its lower position via at least one of gravity, magnetic force or spring force.

Figure 7:
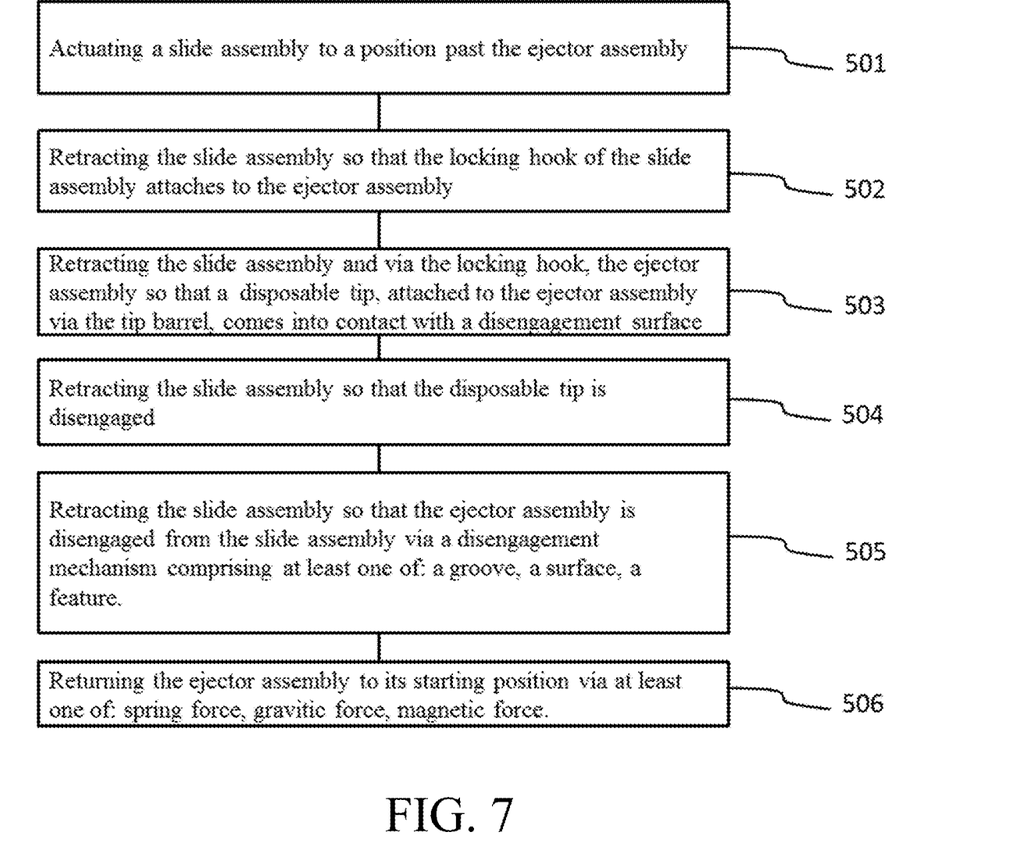
FIG. 7 illustrates a flowchart of a method capable of supporting at least some embodiments of the present invention.

The steps of the method are shown in FIG. 7.

In some of the embodiments of the present invention, including the first exemplary embodiment, the tip removal is accomplished by retracting the tip mandrel 123 (connected to the ejector assembly 120) into the module body 100, so that the upper edge or upper surface of the tip 150 contacts the module body and, when the mandrel 123 continues to retract, the tip is arrested by the body 100 and removed from the mandrel. In some embodiments it is possible that the tip contacts a component fixedly or movably attached to the body. The tip may contact a stationary contact surface, which refers to a feature fixedly attached or part of the module body, such as at least one of the following: a protrusion, a notch, a bearing, a pin. In certain embodiments, the contact surface may be flexible such as at least one of the following: a spring, a damper. Further, the tip may be removed by first retracting the mandrel until the tip is in contact with the body, as determined by calculation, force measurement, conductive measurement, distance measurement, et cetera and then further actuating the mandrel upwards. In some embodiments, the tip removal may be done in such a manner that the mandrel is retracted at a first speed until the tip surface contacts the module body, and the nudging action is performed by retracting the mandrel at a second speed or a speed profile, wherein the initial speed is low and increases exponentially, or vice versa.

During the tip removal, the body 100 of the pipette may remain stationary. The tip mandrel 123 is attached to the body via the mandrel guide 130, which fixes the mandrel in the sideways directions but allows for up-down movement.

Immediately prior to, during, and after the tip has been nudged off the tip mandrel, the movement of the ejector assembly may be arrested by a spring, a magnet, a fixed component, or a combination thereof, for example the ejector assembly spring, or additionally or alternatively, the slide assembly. In certain embodiments, the ejector assembly in the upper position is arrested by the slide assembly and the ejector spring. The upward movement of the tip may be arrested before the tip is nudged off. This allows for retracting the tip to the upper limit while yet retaining the tip. This can be done for any reason, e.g. when a second, parallel module is picking up a new tip or if the module is not being used for some reason. The position of the ejector assembly while arrested may comprise the upper (retracted) position of the ejector assembly, or for example 90%-99% of the ejector assembly range of motion. In a further exemplary embodiment, the position of the ejector assembly is 95% of the range of motion when arrested.

FIG. 4 depicts the tip removal process. In the leftmost image of FIG. 3, the automated pipette module is operating with the Optiload mechanism engaged. The slide assembly is not coupled to the ejector mechanism. In the middle image, the slide assembly is actuated to a low position so that the locking hook bypasses the locking tab. In the rightmost image, the slide assembly has been actuated upwards, pulling the ejector assembly with it. The Optiload mechanism has been disengaged. In the rightmost image, as a result of the upward motion of the ejector assembly, the tip mandrel moves within the mandrel guide and the disposable tip contacts the tip mandrel guide and is removed.

Figure 5:
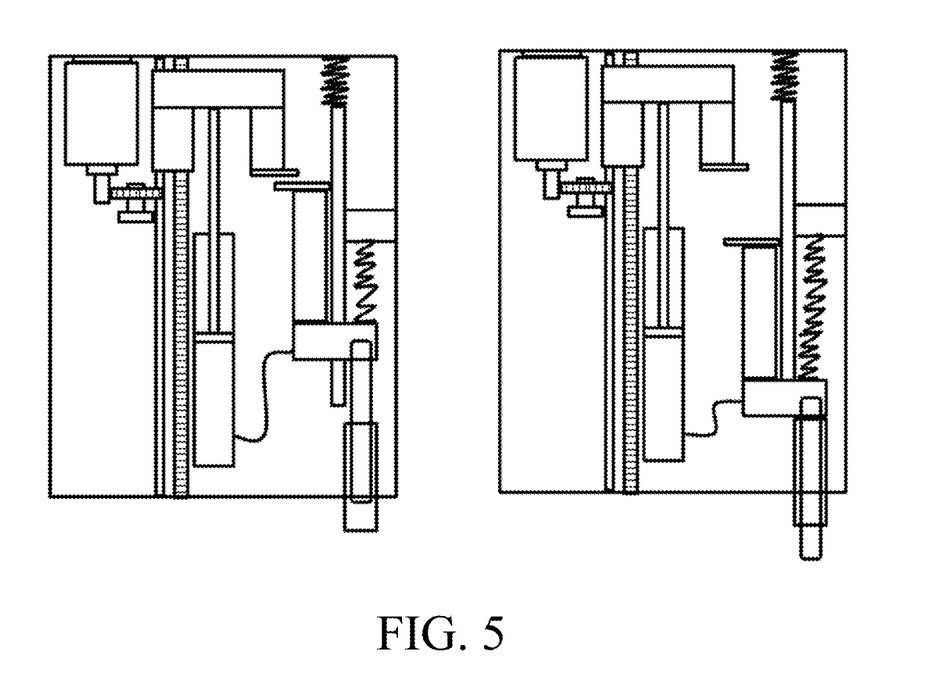
FIG. 5 illustrates a schematic view of decoupling the ejector assembly from the slide assembly in accordance with at least some embodiments of the present invention.

In FIG. 5 the decoupling process of the ejector assembly from the slide assembly is illustrated. Continuing from the process depicted in FIG. 4, in the leftmost image of FIG. 5 the ejector assembly has been lifted up by the slide assembly via the locking hook and locking tab. The Optiload system is disengaged and visible behind the ejector assembly. However, as the image shows, the locking components have been decoupled. The decoupling means are not shown in FIG. 5, but in accordance with the embodiments described herein e.g. the separating element 129 has contacted the locking hook and locking tab. In the rightmost image of FIG. 5, it can be seen that the ejector assembly has been returned to the lower position and the Optiload system has been engaged. The slide assembly remains in the upper position and the pipette module is ready for operation. Picking up a new tip is facilitated by the Optiload system stiffening the ejector module in this exemplary embodiment. The process is described in further detail in the following paragraphs.

Figure 3:
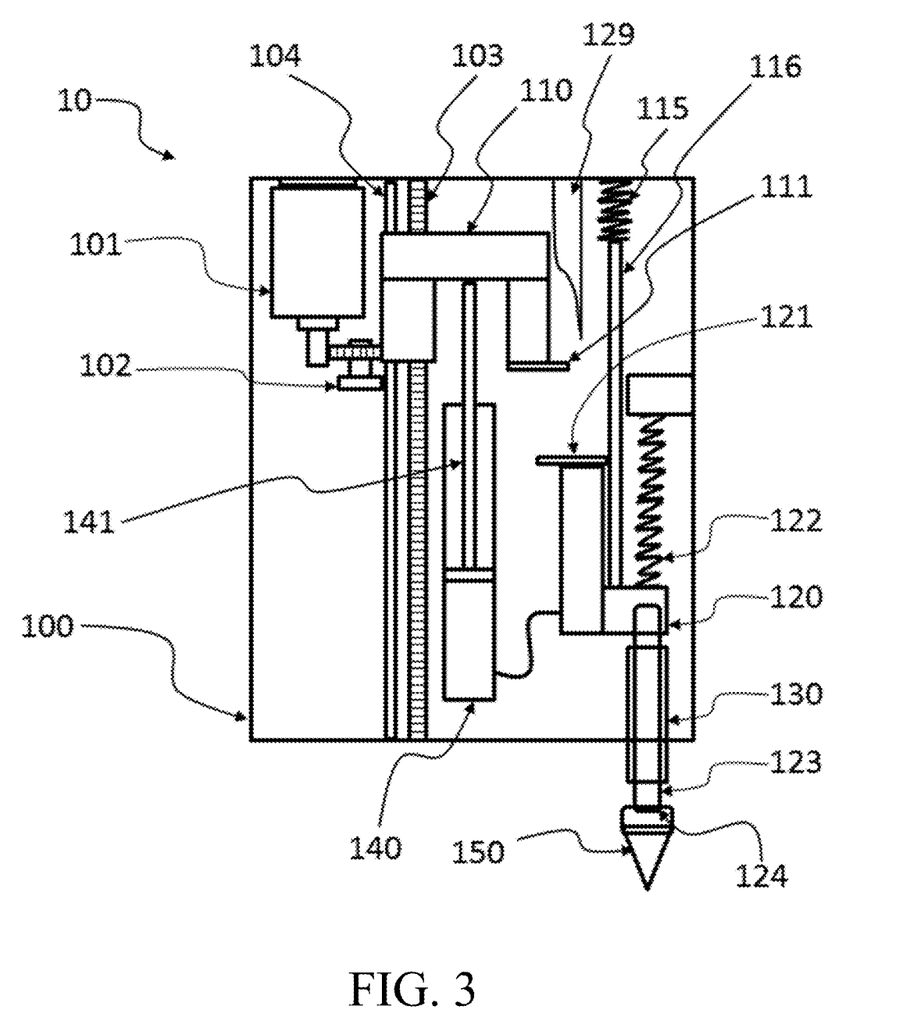
FIG. 3 illustrates a schematic view of an automated pipette module utilizing a disengagement guide in accordance with at least some embodiments of the present invention.

In at least some embodiments of the present disclosure, the disengagement may be performed by utilizing a guide slope 129. In the first embodiment, to return the pipette to normal operation, the slide assembly 110 (attached to the ejector assembly 120 via the locking hook 111 and locking tab 121) is actuated upwards. At a point of the upward motion, the ejector assembly, the slide assembly or a combination of the two comes into contact with a guide 129, which separates the locking tab from the hook. The guide 129 may comprise at least one sloped surface, wherein the ejector assembly contacts the surface during movement and the slope of the surface results in the locking tab being separated from the hook.

In certain embodiments, the sloped surface is comprised by the ejector assembly or slide assembly or both of the assemblies, i.e. the guide is integrated into at least one of the assemblies. The separation may be accomplished by contacting the tab or contacting the hook, wherein the contact affects the movement path of the tab or hook (as the slide assembly and ejector assembly are being actuated upwards even during the guide contact). To reiterate, the upward motion is used to actuate the components and a stationary guide forces one of the locking tab or hook apart from the other. It is understood that, in an exemplary embodiment, the path of the tab or hook will not be linear after contacting the sloped or curved guide. Rather, the path of the component it will form a curve, while the counterpart will continue in a different direction (e.g. a linear path). In some embodiments, the material of the tab or hook will deform or bend when the guide is in contact with the tab or hook. The space formed between the counterpart components will allow the ejector assembly to bypass the hook and return to the lower, normal position. Alternatively, in a configuration containing two guides, both locking components may contact a guide surface. The guide surface may comprise a grooved path, wherein the path may be linear or any type of curve in three dimensions.

In the embodiments of the present disclosure, the guide slope may be in any plane relative to the components. In an exemplary variation of the first embodiment, the locking hook is moved (yawed) sideways relative to the movement direction. This is a result of the effect of the upward motion combined with the guide surface. To clarify, referring to FIG. 3, the locking hook 111 or the locking tab 121 is pushed or lifted by the guide slope 129 in the depth dimension of the schematic. In alternate variations, the guide slope(s) may be in either of the two remaining planes, i.e. the components may undergo roll or pitch relative to the movement direction. To reiterate, the slope of the guide may be oriented parallel to the ejector assembly, perpendicular to the ejector assembly or parallel or perpendicular with any relative rotation in clockwise or counter-clockwise directions. In a further exemplary embodiment the guide slope is parallel to the ejector assembly and rotated 60° clockwise on the longer axis.

Figure 2:
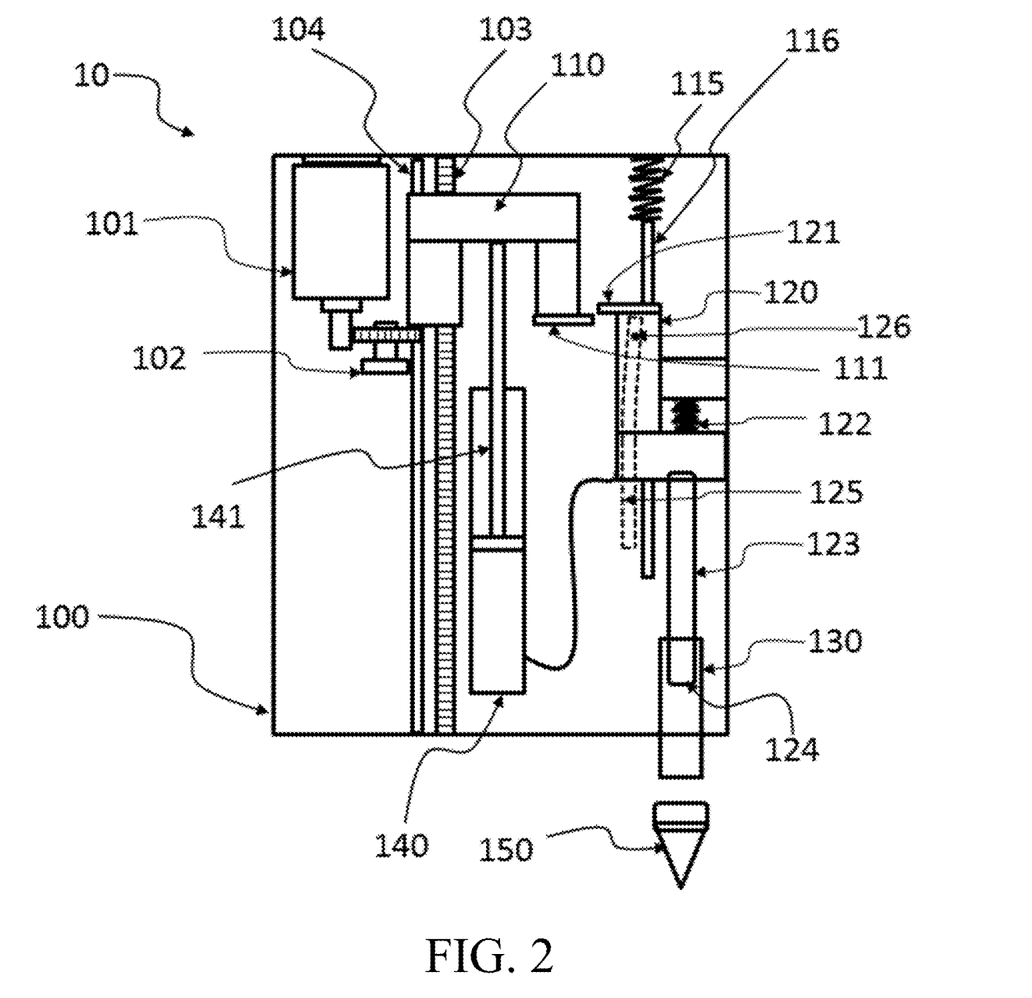
FIG. 2 illustrates a schematic view of an automated pipette module utilizing a disengagement feature and disengagement groove in accordance with at least some embodiments of the present invention.
Figure 6:
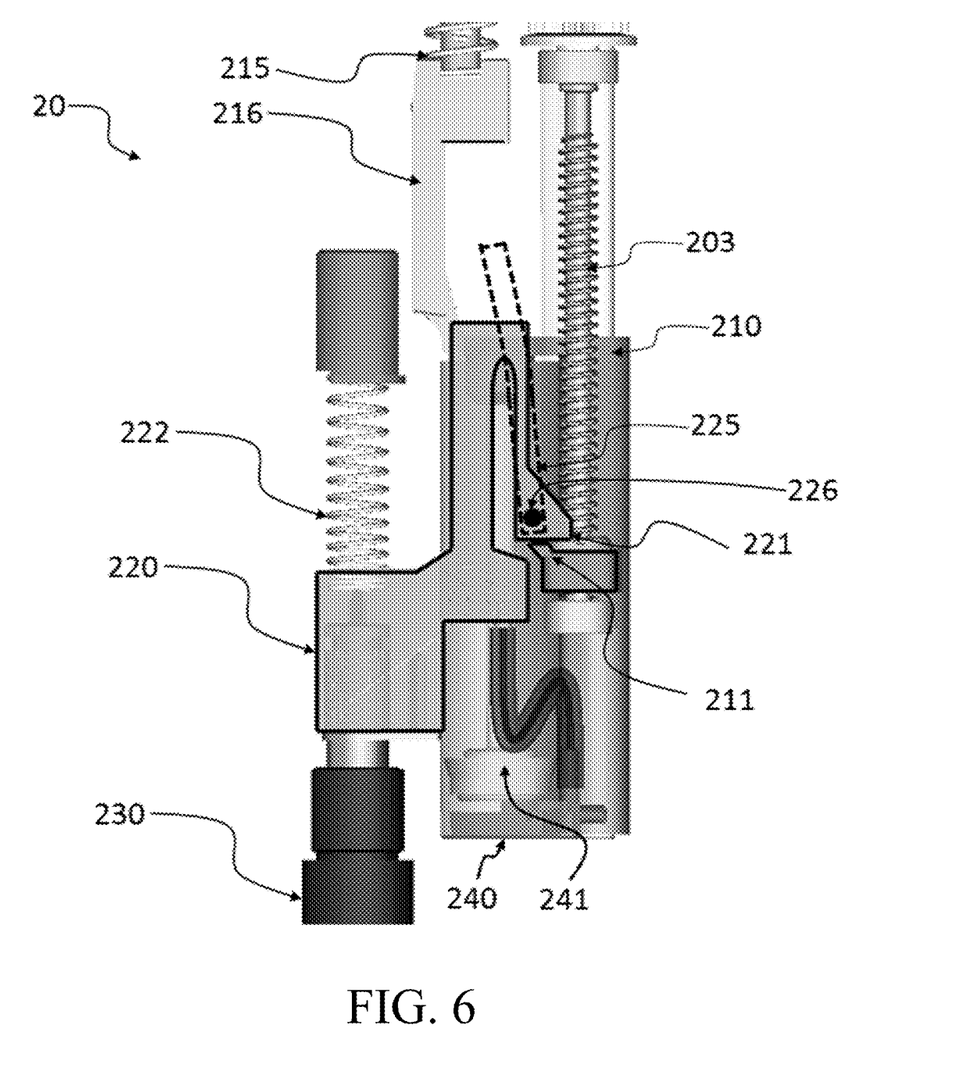
FIG. 6 illustrates a schematic view of an automated pipette module utilizing a disengagement feature and disengagement groove in accordance with at least some embodiments of the present invention.

In at least some embodiments of the present disclosure, the disengagement may be performed by utilizing at least one of a guide feature 126, 226 and a guide groove or guide slot 125, 225. The guide feature may be present on the ejector assembly, the slide assembly, or both of the assemblies. The guide feature may be oriented 90° with respect to the direction of movement. The guide feature may comprise at least one of the following: a pin, a spring, a beating. The guide feature may be in contact with a guide groove formed in the module body or in some other part. When the assembly is actuated upwards, the guide feature travels within the guide groove. At some point of actuation, the guide groove will curve away from the direction of actuation, resulting in separation of the assemblies. The assemblies will then return to the desired positions in accordance with the embodiments described in this disclosure.

The ejector assembly may also additionally function as at least one of: sensor mount, conduit or connector for sensors. In some embodiments, it is beneficial for the ejector assembly to be constructed out of non-conductive material or to incorporate pathways for signal transmission. This allows conductive sensing of the tip condition (such as the tip presence), as the tip mandrel is usually metal. In addition, this allows liquid level detection with conductive pipette tips, such as carbon filled pipette tips, using for example a capacitive measurement principle as well as change detection for e.g. positioning of the pipette.

The locking tab of the ejector assembly may comprise mechanical slots, limbs etc. designed to allow controlled deformation of the tab. Such controlled deformation, i.e. bending or twisting, may be utilized to allow the tab to allow the passage of the locking hook. After the passage has been completed, the resilience of the tab material allows the tab to revert to its original shape, or the construction is equipped with a spring element to strengthen the reverting action. For example, the upper surface of the tab may be sloped so that the hook, when moving downwards, is directed past the tab. The tab will then bend to the side, allowing the hook to pass. Once the head of the hook has passed the tab, the tab reverts to its original shape. When the hook reverses, the upper surface of the hook contacts the lower surface of the tab, forming a mechanical connection. This connection is used to move the ejector assembly in order to nudge the tip off the tip mandrel, as discussed above.

In some embodiments in accordance with the invention, the ejector assembly is flexibly locked in the lower (downward) position by at least the ejector return spring. In embodiments in accordance with the invention the ejector return spring and the Optiload mechanism allow for the desired degree of travel of the ejector assembly and therefore the tip mandrel as detailed elsewhere in the disclosure. There is also a shock damper or impact damper at the lower limit of the ejector assembly, as the ejector return spring allows for fast movement speeds.

In a variation of the first embodiment, the ejector assembly is coupled to the slide assembly via an electromagnet, instead of a purely mechanical linkage. The slide assembly, when actuated downwards, comes into proximity of the upper section of the ejector assembly and the coupling as well as the later decoupling is formed by sending a signal to the magnet(s).

In further variants of the first exemplary embodiment, the automatic pipette module comprises a spring 115 and stiffening element system 116, e.g. an Optiload mechanism. The purpose of such a mechanism is to provide a configuration wherein the pipette tip mandrel is flexibly locked into position. The Optiload mechanism functions as follows: when the ejector assembly is actuated into a relatively low position, the Optiload mechanism moves into position between the ejector mechanism and the upper part of the module body, in such a fashion that the mechanism contacts the upper part of the module body and the ejector assembly, as seen in FIG. 3. This results in the stiffening element acting as a tip pick up force limiter or shock absorber, i.e. a significant portion of the force acting upon the tip mandrel is transmitted to the stiffening element. Further, the upper end of the stiffening element is connected to a spring. This allows for the desired amount of vertical movement of the ejector assembly and therefore of the tip mandrel. The amount of vertical movement corresponds to the force exerted on the tip mandrel and therefore both of the values may be preconfigured or configured by the user. In further exemplary embodiments, the adjustment of the Optiload travel distance (i.e. the vertical movement distance) or the amount of desired force prior to the mechanism withdrawing into the module may be facilitated by at least one of a screw parallel to the movement direction, a screw perpendicular to the movement direction, a cylinder, an adjustable spring, a selectively deformable material.

It is to be understood that the engagement of the Optiload mechanism may comprise vertical, horizontal or lateral movement, deformation, linear paths, nonlinear paths of at least one of the components, including the ejector assembly and the Optiload stiffening element. The Optiload system may be decoupled from the stiffening position by a variety of methods described later in this disclosure.

Use of the Optiload system provides benefits in automated pipette modules. For example, when a tip is being picked (i.e. attached) to the tip mandrel via force-fit, the force exerted on the tip will necessarily also affect the internal mechanisms of the pipette module, such as the slide assembly and transmission. Such an effect may be detrimental to the components. However, when the Optiload mechanism is in use, the force is absorbed and dampened by the Optiload mechanism, thus reducing wear and tear on the components. The Optiload system provides a consistent tip pick up force no matter what the speed of the module is during the pickup. The consistent pick up force allows for optimal sealing of the tip and the force required to detach the pipette tip will be within reasonable limits. Another option to control tip pick up force is to control the Z-motion of the module during pickup based on e.g. current data from the motor(s) or provide a similar stiff spring system for the entire module. These approaches are complex and require a high degree of accuracy as well as space to implement the system in comparison to the Optiload system described herein. In addition, in multichannel module solutions single-channel spring implementation is very complex. Finally, having a separate Optiload system for each module allows for different size tips on modules as well as different spring constants in each module.

Disengaging the Optiload system may be done in different ways in different embodiments. For example, the disengagement may be done via at least one of the following: a guide slope, a magnet, an electromagnet, a motor, a spring, an electromagnet and spring combination. With regards to the disengagement of the Optiload system, in the embodiments of the present disclosure, the guide slope may be in any plane relative to the components, similar to the guide slope of the ejector assembly described above. In alternate variations, the guide slope(s) may be in either of the two remaining planes, i.e. the components may undergo roll or pitch relative to the movement direction. To reiterate, the slope of the guide may be oriented parallel to the ejector assembly, perpendicular to the ejector assembly or parallel or perpendicular with any relative rotation in clockwise or counter-clockwise directions. In a further exemplary embodiment the guide slope is parallel to the ejector assembly and rotated 60° clockwise on the longer axis.

In a second exemplary embodiment, the lead screw is connected to the slide assembly via a lever, wherein the lever has at least two members and at least one joint. In this embodiment the slide assembly is fixedly coupled to the ejector assembly. This linkage allows liquid dispensing using the normal range of motion of the leadscrew. When the leadscrew is actuated to the extreme downward position the lever angle is such that the ejector assembly is actuated upwards relative to the module body. The movement is highly controllable so that precise removal of the tip, as in the other embodiments detailed herein, may be achieved. This embodiment can also be considered a type of selective linkage as the motor can actuate the slide assembly without actuating the ejector assembly. One benefit of this embodiment is that the lever allows the leadscrew length to be shorter than if the slide assembly were fixedly connected to the leadscrew. Other benefits include that the force ratio can be adjusted so that the maximum torque is achieved at the tip removal point, i.e. the torque is not constant across the range of motion but is increased at the tip removal point, which of course is the point where the extra force is most needed. In addition the friction losses are minimal in this type of construction. The second exemplary embodiment may also utilise the Optiload system described previously herein.

In some embodiments of the present disclosure, the backlash, play or clearance of the mechanisms may adjusted or controlled in order to improve the accuracy of the mechanical movements, liquid handling components, tip removal function and ultimately liquid dispensing function. These adjustments may be performed using at least one of the following: a magnet, a spring, control schemes including but not limited to feedback control and feedforward control.

In some embodiments in accordance with the present disclosure, sensor fusion is additionally or alternatively used to accurately detect linear motion of the mechanisms comprising the pipette. This also allows for compensation, adjustment and calibration, which can be done based on variables such as temperature, humidity. In some embodiments, the pipette module includes liquid level detection capabilities.

The invention detailed in the present disclosure provides several technical benefits. The selective linkage between the slide assembly and ejector assembly allows operating the liquid displacement functions without actuating the ejector assembly. Also, it allows for more accurate operation of the cylinder, as the mass and inertia of the components to be moved is reduced, as only a subset of the entire pipetting mechanism is being actuated. A major benefit of the invention is the compact size of the entire module, as a separate tip removal motor or electromechanical actuator is not required. In addition, use of the invention means that a separate mechanism incorporated into a tip removal bin is not required and thus the force exerted on the device is smaller.

A further benefit of the invention detailed in the present disclosure, the controlled and gentle removal of the tip facilitated by the rigid and highly controllable mechanism reduces the possibility of contamination as follows: using the invention, the tip does not leave the tip mount or impact the container at a high speed, potentially flinging droplets into the air which may contaminate samples or surfaces. Another benefit of the invention is that the mechanism allows collecting and storing data such as the force profile of the tip removal process and the exact tip removal position. This data is stored during the tip removal process. The data is beneficial in analysing the operation of the system, for example in reliability analyses, example, if the tip removal is constantly requiring less and less force, this may indicate a problem with the tip cone, as the tip may not attach to the tip cone in future operations. Or, in certain situations, a slick substance such as oil may cover the tip cone and make it difficult to attach the tip to the tip cone. Predictive maintenance can be utilized in accordance with the invention to warn of these types of problems. The analysis may comprise comparing the force profile of the removal process and the analysis may be conducted offline or during operation.

The retractable mandrel in the embodiments disclosed herein also allows to selectively allow the pipette to yield to external forces—i.e. if the pipette tip contacts a non-yielding surface, the ejector assembly will withdraw into the pipette body. This feature may be useful to avoid damage or excessive wear to the pipette mechanism. This feature is facilitated by the combination of the ejector spring as well as the Optiload system, more specifically the Optiload spring. First the ejector spring is compressed and then, e.g. 0.2-1 millimeters later, the Optiload spring is compressed. When the pipette mechanism engages the ejector assembly, it disengages the Optiload system in order to have less force opposing the actuation. The Optiload system also allows detection of situations where the pipette tip contacts a surface. More specifically as the position of the ejector assembly is detected, when the tip contacts the surface the ejector assembly will move slightly and this movement is sensed by the device. The Optiload spring prevents damage to the module during this action.

FIG. 6 shows a third exemplary embodiment in accordance with the present invention. For the sake of clarity, some components have been omitted from the figure such as the motor, transmission, etc. This embodiment operates in a similar manner to the above-mentioned embodiments. It can be seen that the components interact at different places in comparison to the other embodiments, e.g. the locking hook 211 is located near the linear screw 203 and the Optiload mechanism 216 is configured to interact with the ejector assembly 220 at a slightly different position than in the previous embodiment. The decoupling of the ejector assembly 220 and the slide assembly 210 is done via a groove 225 and disengagement feature 226. The groove 225 is formed in the casing of the automated pipette or in a supporting part. The disengagement feature is part of the ejector assembly and may comprise: a pin, a bearing, a cylindrical feature. It can also be seen that the ejector assembly 220 has a structure which allows deformation, namely the arm with the locking tab 221 is deformable to the leftward side of the image due to the design of the assembly, more specifically the void between the arm and the body of the assembly. This embodiment, as well as the other previously mentioned embodiments, operates in accordance with the method explained previously in the disclosure as well as in FIG. 7.

FIG. 7 describes the steps of a method in accordance with the embodiments of this disclosure. The method comprises the following steps:

In step 501, the slide assembly is actuated so that at least a portion of the slide assembly moves past at least a portion of the ejector assembly, In step 502, the slide assembly is retracted so that the locking hook of the slide assembly attaches to the ejector assembly, In step 503, the slide assembly and, via the locking hook, the ejector assembly are further retracted so that a disposable tip, attached to the ejector assembly via the tip barrel, comes into contact with at least one disengagement or contact surface, In step 504, the slide assembly is further retracted, so that the motion of the disposable tip is arrested by the disengagement surface and as a result, the tip is removed from the tip barrel, and In step 505, the slide assembly is retracted so that the ejector assembly is disengage from the slide assembly via a disengagement mechanism comprising at least one of: a groove, a surface, a feature, In step 506, the ejector assembly is returned to its starting position using at least one of spring force, gravitic force or magnetic force.

Additional benefits of the invention include the ability to accurately measure the mandrel motion when picking up (attaching) the pipette tip. During the pickup, the spring compression may be measured by incorporating a sensor to monitor the movement of the ejector slide, which allows for calculating the force used to attach the pipette tip as the relation between the displacement and force is known. The sensor may comprise at least one of: linear hall element sensor, other magnetic technology sensor, optical sensor or a mechanical switch to detect initial movement. Also, this allows for monitoring tip presence during tip pick up, as in the absence of a tip the cylinder will not move in the same fashion.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment or variation means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In this description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in liquid handling systems.

REFERENCE SIGNS LIST

| | |
|---|---|
| 10, 20 | automated pipette module |
| 100 | module body |
| 101 | motor |
| 102 | transmission |
| 103, 203 | leadscrew |
| 104 | linear guide |
| 110, 210 | slide assembly |
| 111, 211 | locking hook |
| 115, 215 | optiload spring |
| 116, 216 | optiload mechanism |
| 120, 220 | ejector assembly |
| 121, 221 | locking tab |
| 122, 222 | ejector mechanism spring |
| 123 | tip mandrel |
| 124 | tip cone |
| 125, 225 | disengagement groove |
| 126, 226 | disengagement feature |
| 129 | disengagement guide |
| 130, 230 | mandrel guide |
| 140, 240 | cylinder |
| 141, 241 | piston |
| 150 | disposable tip |
| 501-506 | Steps of method |

The invention claimed is:

1. ARA pipette system comprising:
a module body, said body comprising a stationary contact surface, and an ejector assembly, comprising a mount for a pipette tip;
a cylinder and piston in the cylinder;
a slide assembly; and
a motor, located within the module body and configured to: dispense liquid by actuating the piston in the cylinder, and to move the ejector assembly in a first direction in such a manner that the pipette tip contacts the contact surface and disengages from the mount,
wherein the ejector assembly is partly located within the module body, wherein the motor is selectively coupled to the ejector assembly by the slide assembly, and wherein the slide assembly and the ejector assembly are attached or detached from one another based on a position of the slide assembly.

2. The system of claim 1, wherein the mount protrudes through the stationary contact surface.

3. The system of claim 1, wherein the slide assembly comprises a locking hook, the ejector assembly comprises a locking tab, and the motor is configured to disengage the pipette tip by:
first actuating the slide assembly in a second direction, so that the locking hook engages the locking tab of the ejector assembly and
then actuating the slide assembly in the first direction so that the ejector assembly is actuated in first direction with respect to the module body.

4. The system of claim 3, wherein the system further comprises a guide located within the module body and comprising a sloping surface in a third direction, the guide configured in a such manner that when the ejector assembly contacts the sloping surface during movement, the locking hook disengages from the locking tab.

5. The system of claim 1, wherein the ejector assembly comprises a non-conductive material.

6. The system of claim 1, wherein the system comprises a selective stiffening system located within the module body and comprising a mechanism suited for arresting and a spring.

7. The system of claim 6, wherein the stiffening system is configured to move into a position contacting the ejector assembly and thereby act as a shock absorber for the ejector assembly and the mount.

8. A method for removing a pipette tip attached to a mount of a pipette system, said system comprising a module body comprising a stationary contact surface, an ejector assembly an ejector assembly located partly within the module body, a piston in a cylinder, a slide assembly, and a motor located within the module body and which is configured to dispense liquid by actuating the piston in the cylinder; wherein the motor is selectively coupled to the ejector assembly by the slide assembly, wherein the slide assembly and the ejector assembly are attached or detached from another based on a position of the slide assembly;

the method comprising using the motor located within the module body to actuate the ejector assembly located partly within the module body of the pipette system in a first direction with respect to the module body, so that the pipette tip contacts the stationary contact surface of the module body and disengages from the mount.

9. The method of claim 8, wherein the slide assembly comprises a locking hook, the ejector assembly comprises a locking tab, and the pipette tip is disengaged by:

first actuating the slide assembly in a second direction, so that the locking hook engages the locking tab of the ejector assembly and by then actuating the slide assembly in the first direction so that the ejector assembly is actuated in a first direction with respect to the body.

10. The method of claim 8, wherein the ejector assembly comprises a non-conductive material.

11. The method of claim 8, wherein the ejector assembly is disengaged from the motor by contacting a sloping surface of the pipette system.

12. The method of claim 8, wherein the pipette system comprises a selective stiffening system located within the module body and comprising a mechanism suited for arresting and a spring.

13. The method of claim 12, wherein the stiffening system is configured to move into a position contacting the ejector assembly and thereby act as a shock absorber for the ejector assembly and the mount.

* * * * *